UNITED STATES PATENT OFFICE 2,291,693

PROPAGATION OF PLANTS

Silvia Colla, Buenos Aires, Argentina, assignor to Radix-Sociedad de responsabilidad limitada, Buenos Aires, Argentina No Drawing. Application December 23, 1938, Serial No. 247,360. In Luxemburg January 29, 1937

13 Claims. (Cl. 47—58)

Since the first work of Went, in 1932, considerable study has been made of the action of auxins and of chemical bodies which are not themselves auxins but have biological effects somewhat similar to the auxins on the formation of root growths. A number of different compounds useful for such purpose have been suggested which according to the literature are considered qualitatively to be more or less equivalent for each other.

It is recognized that the auxin-like substances which stimulate root growth also have a toxic effect upon the cuttings which are being treated, and for this reason it has been found that very particular concentrations of the auxin-like substances must be employed to give the desired effect without unduly injuring the cutting.

I have discovered that the various auxin-like substances can be divided into at least two general classes and that if one or more substances from one of the classes is mixed with one or more substances from the other of these two main classes, the activity of the auxin-like chemical compounds toward stimulating root growth is increased and at the same time the toxicity is apparently diminished. As a result when substances from the two classes are combined together, results are obtained greatly superior to the use of substances from only one of these classes.

The two classes into which the various auxin-like substances to which this application relates fall are: on the one hand the indole substitution products of a compound having a lower fatty acid radical in its nucleus; and on the other hand the naphthalene and anthracene substitution products of a compound having a lower fatty acid radical in its nucleus. In each case (and also where used in the claims) the phrase descriptive of the class is intended to include the acid compound or one of its salts, esters or nitriles and also to include homologues where one of the hydrogens of one of the ring nuclei is substituted by a $CH_3$ group or an aliphatic radical. Typical examples of substances within the first group are 3-indole acetic acid or one of its esters, salts or nitriles or other lower fatty acids or acid compounds such for example as the propionic or butyric acids or compounds. In the same way, examples of substances in the second group include naphthalene acetic acid or anthracene acetic acid or one of their salts, esters or nitriles or the corresponding propionic or butyric acids or compounds.

In my studies I have found that the optimum proportions in which the ingredients from these two classes may be employed vary within exceedingly wide limits, and even very small proportions of a second compound may add surprising effectiveness to the action of the main compound employed. Thus a noticeable difference can ordinarily be obtained if as little as one part to a thousand (by weight) of a substance from either one of the groups is employed with one or more substances of the other of the groups. In making up standardized mixtures to be effective for the greatest number of species, I find that ordinarily it is advantageous to have an excess of the substance from the substituted indole group and this excess usually will range from double the amount by weight, up to 100 times the amount of the substance comprising the condensed aromatic nuclei, but as already stated, in some circumstances great benefits are obtained where the indole compound is in a very minor proportion. By combining two types of auxin-like substances, I find that I can materially broaden the limits of concentration in the selected excipient within which really good results are obtained for any given species.

In addition to inducting root growth, the types of root are also important, together with the tissue structure or callus which develops on the base of the plant, and I have discovered that if, with the mixed auxin-like substances suggested, there is included a very small amount of boron, the type of roots and the nature of the callus growth can be greatly improved. The boron may be included in the form of various salts or in some cases can even be included in the compound in the form of physiological compounds containing boron such as those that can be obtained by drying and powdering various organisms grown under conditions where they absorb boron. I have found, however, that a very convenient form of boron to be employed is sodium tetraborate ($Na_2B_4O_7.10H_2O$). In such case, the sodium appears partly to neutralize the acids of the auxin-like substances and the whole mass apparently is activated.

The amount of boron that may be employed will range over quite wide limits but the percentage of actual boron present generally should fall within the range of from one-tenth of 1% to about 7% by weight of the sum of the auxin-like substances. If the tetraborate indicated is employed, the amount used ordinarily will be between about 1% and 60% of the amount of the mixed auxin-like substances. Even if only one of the auxin-like substances is used, its effect may be improved by the addition of boron.

I prefer to make up the mixed acids and the boron compounds into tablets or powder of known composition and when these are used for inducing root growth on cuttings, predetermined quantities of water usually are added as an excipient to give proper concentrations as is understood by those working in this field. As an alternative, the auxin-like substances and the boron may be compounded into the form of paste with substances such as petrolatum, lanolin, paraffin oil, olive oil, cocoanut oil or the like in which the constituents are included in such a manner as to permit the activating substances to penetrate gradually but continuously into the tissues. The excipients may advantageously include some finely divided material having abrasive qualities such as powdered diatomaceous earth or silex or other similar body which will produce very small wounds on the bark through which the activating agents may pass. This simplifies and improves the effectiveness of application.

Components of this type may be employed not only for stimulating root growth in connection with runners and layers but also may be employed in stimulating tissue growth for healing wounds on green branches or trunks of trees or for facilitating grafting or budding. Here again the concentration may be adjusted to the particular circumstances, for it is necessary to use a concentration which provokes the formation of the tissue growths but does not result in either the death or the partial necrosis of buds. Thus in the case where one is budding a rose bush, if the concentration is too strong, there may be an over-production of healing tissue but the hibernating bud will frequently die. On the other hand where the dosage is correct, the "taking" of the graft or bud may be complete in as litle as five to six days and the bud will develop and produce a new branch even out of season. I have also found that the application of auxin-like substances of the type specified in the case of certain trees stimulates an increase of alkaloids, tannins and other active substances in the bark. Under some circumstances this may be of value apart from the increased healing action.

As an added benefit, particularly in the case where root growth is being stimulated on cuttings, I find that it is advantageous to include in the solution in which the cuttings are soaked, minute traces of bios substances and also small quantities of carotene, as the presence of these ingredients tends to stimulate the growth. These substances can conveniently be supplied as dilute solutions in alcohol or other usual organic solvent.

It is also advantageous to supply the cutting with mineral salts to aid its growth during the time that the roots are being formed. Thus after soaking the cutting in the auxin-like substances together with the boron compound and preferably with the minute trace of bios substance and carotene, the cutting may advantageously be soaked in a dilute solution of mineral salts of the type found in vegetable growths such for example as magnesium sulphate, potassium chloride or other mineral acid salts of the same and similar substances, together with organic material such as dextrines and dextrose, together with protein derivatives such as amino acids and preferably a disinfectant such as boric acid.

By following this procedure an exceedingly high proportion of satisfactory results can be obtained.

This aplication is a continuation in part of my application Serial No. 186,256, filed January 21, 1938.

What I claim is:

1. A composition for the purposes set forth comprising a mixture of an indole substitution product of a compound having a lower fatty acid radical in its nucleus with a substance selected from the group consisting of the naphthalene and anthracene substitution products of a compound having a lower fatty acid radical in its nucleus the amount of the indole substitution product in such mixture being from double to 100 times by weight the amount of the substance from the other group specified.

2. A composition for the purposes set forth comprising a mixture of an indole substitution product of a compound having a lower fatty acid radical in its nucleus, a substance selected from the group consisting of the naphthalene and anthracene substitution products of a compound having a lower fatty acid radical in its nucleus and also a boron-containing substance.

3. A composition as specified in claim 2, in which the boron-containing substance is present in an amount sufficient so that the actual boron present is equal to from about 0.1% to about 7% by weight of the other substances specified.

4. A compound for the purposes specified comprising an excipient, the ingredients specified in claim 2 and also traces of a bios substance and small proportions of carotene.

5. A paste for the purposes specified comprising a viscous excipient, the ingredients specified in claim 2 and finely divided abrasive material.

6. A composition for the purposes set forth comprising a substance selected from the group consisting of the indole, naphthalene and anthracene substitution products of a compound having a lower fatty acid radical in its nucleus, with a boron-containing substance present in an amount sufficient so that the actual boron present is equal to from about 0.1% to about 7% by weight of the first mentioned substance present.

7. The method of propagating plants from cuttings and the like which comprises subjecting the cutting to the action of a compound as specified in claim 2 and then soaking the ends of such cuttings in a solution comprising mineral salts, dextrin and protein derivatives.

8. The method of propagating plants from cuttings and the like which comprises subjecting the cutting to the action of a compound as specified in claim 2 and then soaking the ends of such cuttings in a solution comprising mineral salts, dextrin, protein derivatives and a disinfectant.

9. In the art of causing growth to take place in stem members separated from their original root systems, as in the propagation by cuttings, graft scions and buds, the step of applying to such a stem member a composition comprising a mixture of an indole substitution product of a compound having a lower fatter acid radical in its nucleus with a substance selected from the group consisting of the naphthalene and anthracene substitution products of a compound having a lower fatty acid radical in its nucleus.

10. A method comprising the step specified in claim 9, after which the stem member is soaked in a solution comprising mineral salts, dextrin and protein derivatives and then such end is inserted in a medium adapted to be used for the propagation of cuttings.

11. A method comprising the step specified in claim 9, after which the separated stem member is set into a growing stem member which likewise has been treated with such a compound.

12. In the art of budding or grafting, the step of applying to at least one of the substances to be united a composition comprising a mixture of an indole substitution product of a compound having a lower fatty acid radical in its nucleus, a substance selected from the group consisting of the naphthalene and anthracene substitution products of a compound having a lower fatty acid radical in its nucleus and also a boron-containing substance.

13. A method as specified in claim 12 in which the boron-containing substance is present in the composition specified in an amount sufficient so that the actual boron present is equal to from about .1% to about 7% by weight of the other substances specified.

SILVIA COLLA.

CERTIFICATE OF CORRECTION.

Patent No. 2,291,693.

August 4, 1942.

SILVIA COLLA.

It is hereby certified that error appears in the printed specification of the above numbered patent requiring correction as follows: Page 1, second column, line 25, for "inducting" read --inducing--; page 2, first column, line 22, for "Components" read --Compounds--; and second column, line 62, claim 9, for "fatter" read --fatty--; and that the said Letters Patent should be read with this correction therein that the same may conform to the record of the case in the Patent Office.

Signed and sealed this 20th day of October, A. D. 1942.

(Seal)

Henry Van Arsdale,
Acting Commissioner of Patents.